United States Patent

[11] 3,590,355

| [72] | Inventors | Lanny L. Davis;<br>Wilmer G. Radke, both of Bremerton, Wash. |
|---|---|---|
| [21] | Appl. No. | 868,329 |
| [22] | Filed | Oct. 22, 1969 |
| [45] | Patented | June 29, 1971 |
| [73] | Assignee | The United States of America as represented by the Secretary of the Navy |

[54] DIGITAL POSITIONING MOTOR CONTROL FOR AN ELEVATOR
3 Claims, 5 Drawing Figs.

[52] U.S. Cl. .................................................. 318/602,
318/603, 318/614, 318/561, 187/29, 318/594, 318/593
[51] Int. Cl. ............................................................ G05b 19/28
[50] Field of Search............................................ 318/602, 603, 561, 614, 593, 594; 187/29

[56] References Cited
UNITED STATES PATENTS

| 2,792,545 | 5/1957 | Kamm | 318/(20.315 X) |
| 3,206,665 | 9/1965 | Burlingham | 318/(20.320 X) |
| 3,223,200 | 12/1965 | LeJeune | 187/29 |
| 3,414,088 | 12/1968 | Bruns et al. | 187/29 |
| 3,436,696 | 4/1969 | Carlisle et al. | 318/(20.315 X) |
| 3,483,950 | 12/1969 | Simpson | 187/29 |

Primary Examiner—T. E. Lynch
Attorneys—R. S. Sciascia and Charles D. B. Curry

ABSTRACT: An elevator control system having an encoder connected to the elevator cable drum shaft that provides output signals indicating the exact position of elevator travel. The output of the encoder is sensed by a plurality of comparators which provide output signal at top and bottom maximum travel positions and various intermediate positions. At a predetermined distance on both sides of these positions, the comparators provide signals to slow down the elevator. Speed control logic employing the encoder, flip-flops and a comparator is also employed.

INVENTORS
LANNY L. DAVIS
WILMER G. RADKE
BY
Charles P.G. Curry
ATTORNEY

DIGITAL POSITIONING MOTOR CONTROL FOR AN ELEVATOR

The invention described herein may be manufactured and used by or for the Government of the United States of America for governmental purposes without the payment of any royalties thereon or therefor.

The present invention relates to control systems for use on limited operating range mechanisms driven by a machine providing rotary motion, and more particularly, for the control of elevators and rammer cart systems employed on naval vessels and the like.

The control and positioning of elevators installed on naval vessels has long been a cumbersome procedure. Limit switches, electromagnetic sensors, actuating cams, slotted mounting brackets to allow limit switch alignment, cables to carry limit switch signals to the controller are some of the costly and cumbersome equipment employed in previous systems. The unique features of the present invention make it possible to effectively control elevators and the like by eliminating these various elements and using in their place an encoder and logic system.

Briefly, the present invention uses an encoder device which is programmed in a manner that cooperates with a digital logic system for controlling the elevator. The encoder is directly connected to the cable drum shaft to sense the exact position of travel of the elevator. The encoder information is applied to the inputs of a plurality of comparators. These comparators provide output signals when the elevator is at the top and bottom maximum travel positions and at the various intermediate stop positions. At a predetermined distance on both sides of these positions, the comparators provide signals to slow down the elevator. Speed control of the elevator is achieved by using the least significant digit produced on the outside track of the encoder. The encoder provides a square wave pulse the rate of which is in direct proportion to the speed of the elevator platform. By this technique, it is possible to provide a very precise speed indicator which is handled by a pulse counter and logic system that is reset at regular intervals of time. Other objects, advantages and novel features of the invention will become apparent from the following detailed description of the invention when considered in conjunction with the accompanying drawings wherein:

Figure 1:
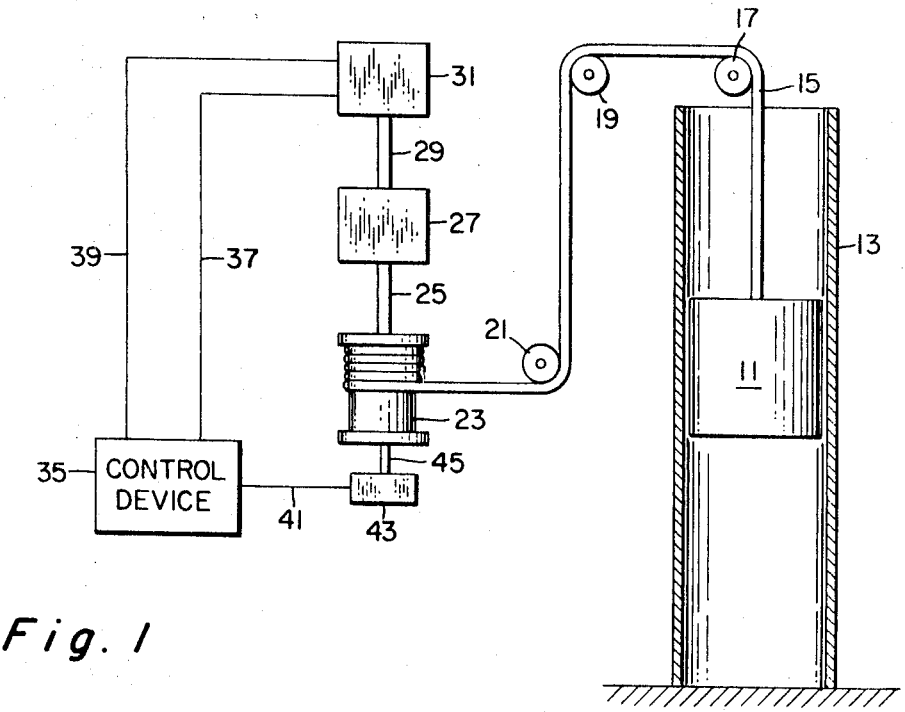
FIG. 1 is a schematic diagram of an elevator system which is controlled in accordance with the control system of the present invention.

FIG. 1 is a schematic diagram of an elevator system which is controlled in accordance with the present invention. The elevator system comprises an elevator 11 which is raised and lowered within shaft 13 by means of cable 15. Cable 15 is supported by pulleys 17, 19 and 21 and has one end connected to cable drum 23. Drum 23 is driven by output shaft 25 of speed reduction gearbox 27. The input shaft 29 of gearbox 27 is driven by a two-speed motor 31, the high speed and low speed windings of which are selectively operated by control device 35 through electrical lines 37 and 39, respectively. Control device 35 receives an input signal through electrical line 41 from encoder 43 which is directly connected to shaft 45 of cable drum 23.

Figure 2:
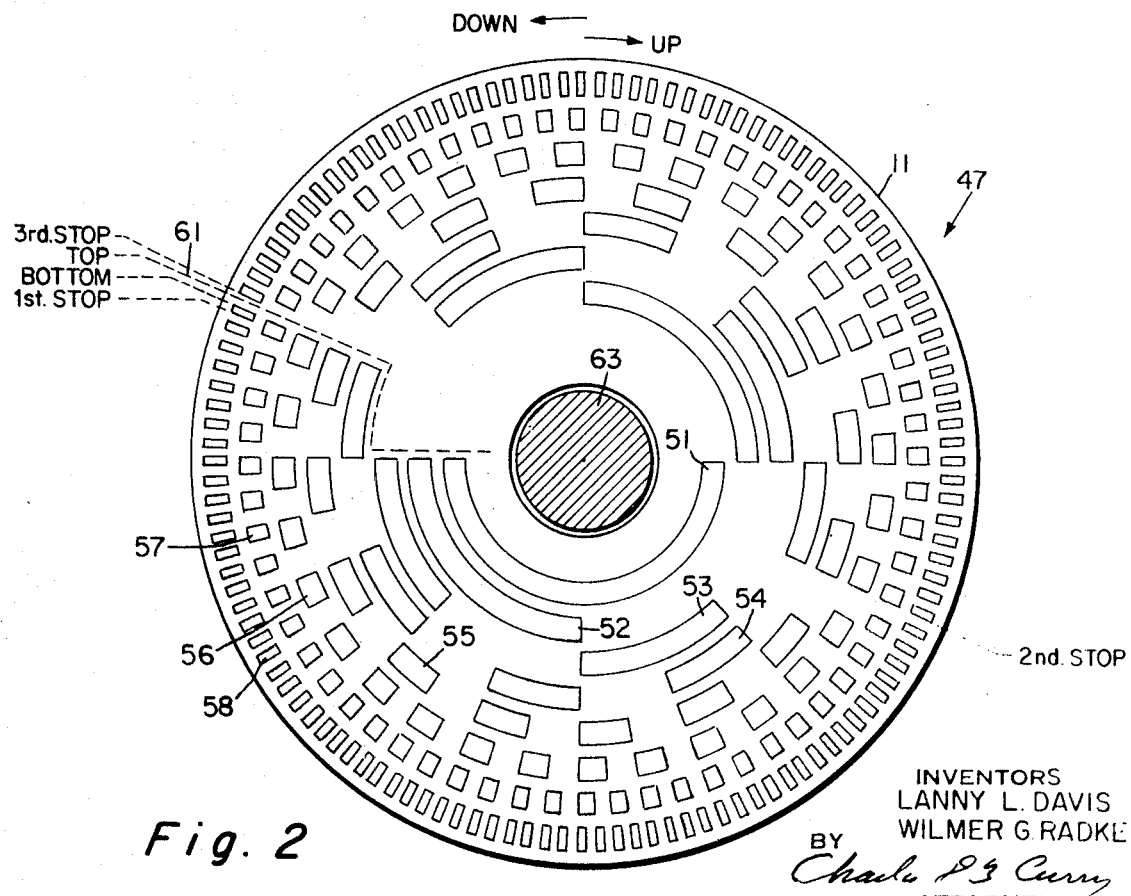
FIG. 2 is an illustration of an eight-channel encoder disc used in the present invention.

In FIG. 2 is illustrated an eight-channel encoder disc 47 of encoder 43 used in the present invention. This encoder disc has eight tracks 51—58 and electrical pickups for the tracks along dotted line 61. The encoder shaft 63 is connected to shaft 45 of the cable drum of FIG. 1. As illustrated in FIG. 2 the encoder disc is at the position of maximum upward travel. As indicated by the associated arrows, upward travel is rotation in the clockwise direction and downward travel is rotation in the counterclockwise direction. Five additional encoder channels, not shown, are employed and are connected to shaft 63 through a 32:1 ($2^5$:1) gear reduction. These 13 encoder tracks provide 8192 ($2^{13}$) positions. Accordingly, with a cable drum having a circumference of 11 feet, for example, there will be a cable travel of approximately one sixty-fourth inch represented by each consecutive code output from the encoder.

Figure 3:
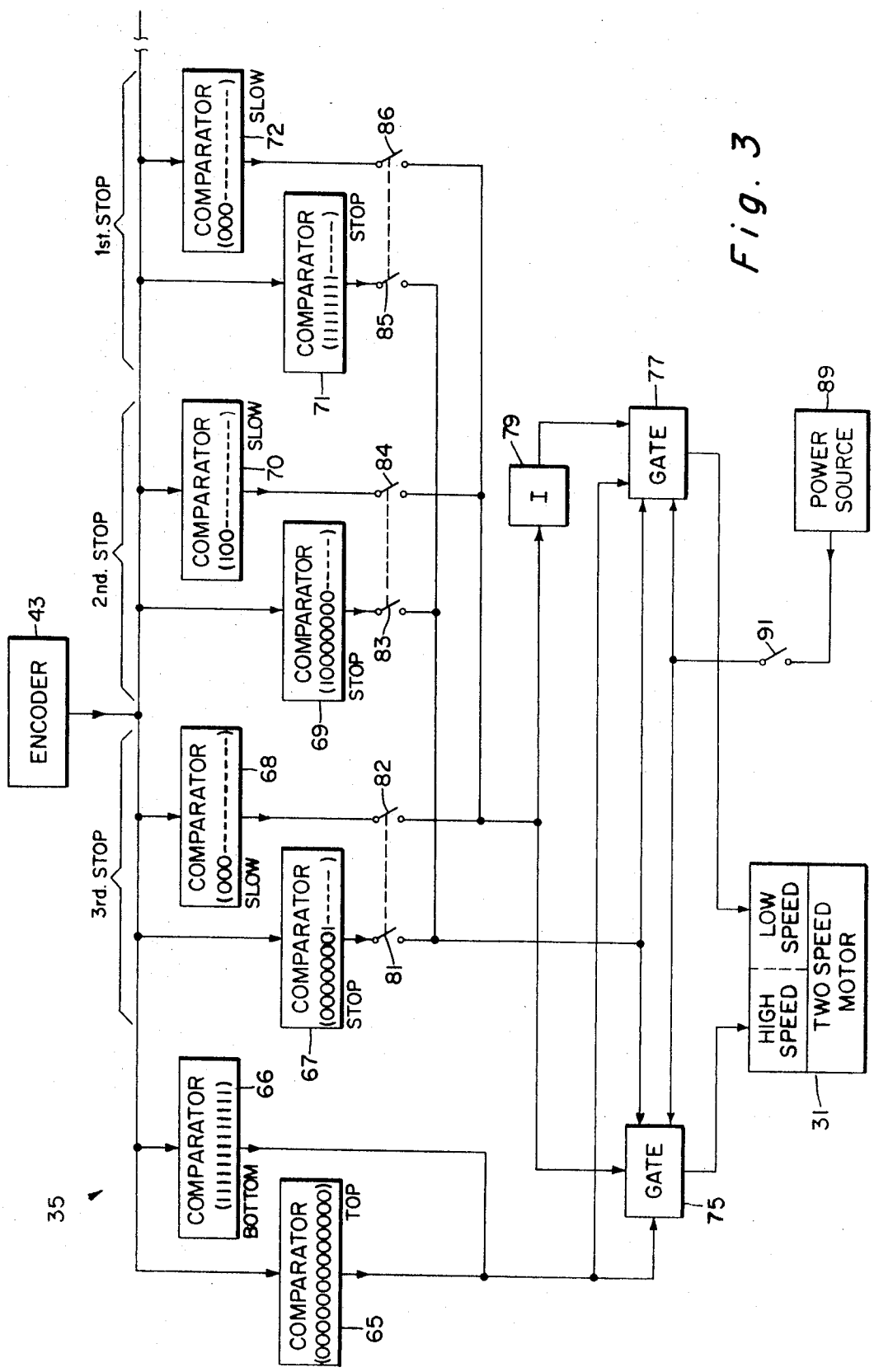
FIG. 3 is a block diagram of the control device of the present invention.

In FIG. 3 is illustrated a block diagram of control device 35 of the present invention. The control device includes a plurality of digital comparators 65 through 72, gates 75 and 77, inverter 79, and switches 81 through 86. Power for two-speed motor 31 is supplied by power source 89 through power switch 91 to the inputs of gates 75 and 77, respectively.

The output of encoder 43, having 13 channels of digital information, is applied to the inputs of comparators 65 through 72. Comparators 65 and 66 function as emergency stops of the elevator so that the elevator will not travel past its uppermost and lowermost allowable positions, respectively. The lowermost position is indicated by an encoder signal wherein all of the 13 bits are 1's and the uppermost position is indicated by an encoder signal wherein all 13 bits are 0's. The outputs of comparators 65 and 66 are applied to the inputs of gates 75 and 77 so that the gates will be turned off when the encoder signal is either all 0's or all 1's. When gates 75 and 77 are both turned off then no power is supplied to motor 31 from power source 89 and the elevator stops.

Comparator pairs 67 and 68, 69 and 70, and 71 and 72 correspond to first, second and third elevator stop positions, which may correspond to first, second and third floors, for example. It is to be understood that additional stops and comparators may be employed; however, for simplicity only three stops are shown and it will be obvious to skilled in the art that additional stops and comparators would be similarly connected to gates 75 and 77 and inverter 79. The output of stop comparator 67 is connected through switch 81 to the inputs of gates 75 and 77 and the output of slow comparator 68 is connected through switch 82 to the input of gate 75, and to the input of inverter 79 the output of which is connected to the input of gate 77.

OPERATION

Assuming that the elevator is at the uppermost position, which may be a slight distance above the upper floor or third stop position, the encoder provides an output of all 0's. If it is desired to move the elevator to the third floor, then power switch 89 is closed and gang switches 81 and 82 are closed. It should be noted that comparator 65 provides an output signal when the encoder has all 0's; however, reset switches, not shown, reset or remove the output signal from comparator 65 when switches 81 and 82 are actuated. From the encoder diagram of FIG. 2 it can be seen that the first three digits (channels 51, 52 and 53) of the encoder are 0's. Therefore, an output signal is provided from comparator 68 which turns off gate 75 and leaves gate 77 on. Gate 77 is left on because the signal from comparator 68 is inverted by inverter 79. Therefore, the low speed winding of motor 31 slowly drives the elevator downward until it arrives at the third stop position that is sensed by comparator 67 which provides an output signal that turns off gates 75 and 77 which prevents power from being applied to motor 31. The third stop position is indicated in FIGS. 2 and 3 by an encoder signal (00000001———). The last five digits are not shown for reasons of simplicity; however, it will be understood by those skilled in the art that they could be any combination of 1's and 0's depending on the exact position selected for stopping the elevator when the eighth digit (channel 58) is a 1.

It should be particularly noted that when channels 51, 52 and 53 are 0's, which condition exists for a total elevator travel of about 1.4 feet, for example, or 0.7 feet on either side of the third stop, that only the low speed winding can operate.

This means that if there is an overshoot of the third stop, in either the up or down directions, that the high speed winding will not be operating and the operator will have more time to remedy the situation by opening switch 91 which then functions as an emergency stop switch. Although not shown for reason of clarity, an automatic jog circuit may be incorporated to reposition the elevator at the desired position in the event there is an overshoot.

After the elevator has come to rest as the third stop position then the operator may move the elevator downward to the second stop position by opening switches 81 and 82 and closing switches 83 and 84 and 91. It should be noted that comparator 70 provides an output signal only when channels 51, 52 and 53 have a digital readout of 1, 0, 0, respectively. Therefore, from FIG. 2 it can be seen that only the slow speed winding will operate when the elevator is about 0.7 feet on either side of the second stop position. After the elevator leaves the slow region of the third stop position the high speed winding drives the elevator downward. This is because gate 75 is open (no signal is applied to its input) and gate 77 is closed because no signal is applied to the input of inverter 79 which therefore provides an output signal that turns off gate 77. The high speed winding is turned off and the low speed winding is turned on when the elevator arrives at the slow region which is about 0.7 feet on either side of the second stop as indicated by an encoder output of 100—————. The elevator then stops at the second stop position which may be indicated by an encoder signal of 10000000——. The last five digits will determine the exact stopping position when the first 8 bits are as indicated. As with the third stop position the low speed winding stays in operation if there is an overshoot of the second stop position.

The elevator is moved downward from the second stop position to the first stop position when switches 83 and 84 are opened and switches 85, 86 and 91 are closed. The elevator will move downward at high speed from the second stop position to about 0.7 feet from the first stop position where the first three digits of the encoder are 111 (channels 51, 52 and 53) so that the low speed winding is turned on and the high speed winding is turned off by the output from comparator 72. The elevator is then stopped by comparator 71 at the first stop position or when the elevator is at the first floor as indicated by an encoder output of 11111111——.

The operation of the elevator in the upward direction will be obvious from the previous description and will therefore not be described. It is to be understood that separate reversing switches, not shown, for the high and low speed winding are provided for upward and downward elevator travel.

Figure 4:
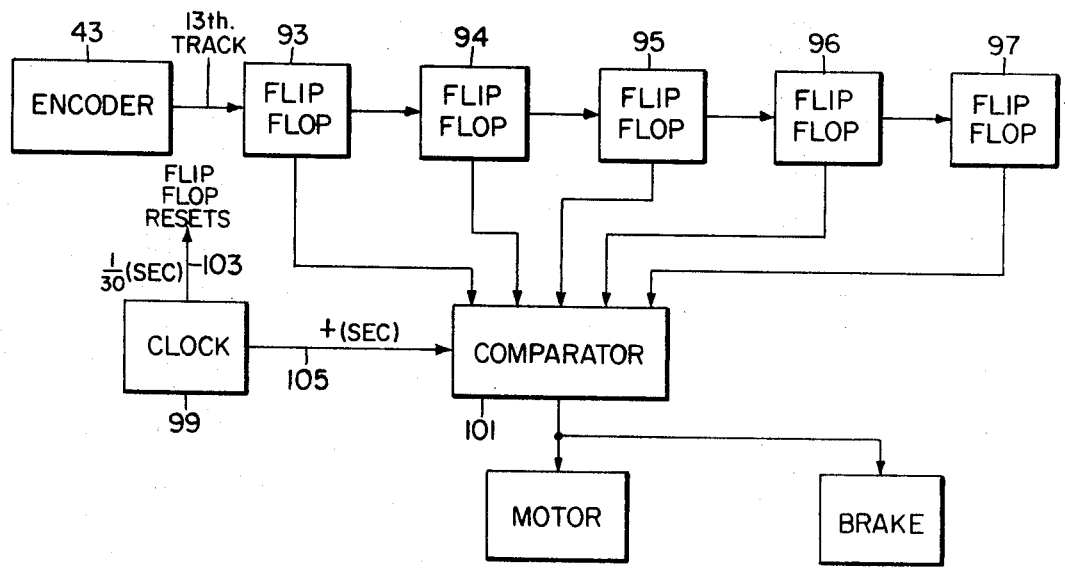
FIG. 4 is a block diagram of the speed control circuit of the present invention.
Figure 5:
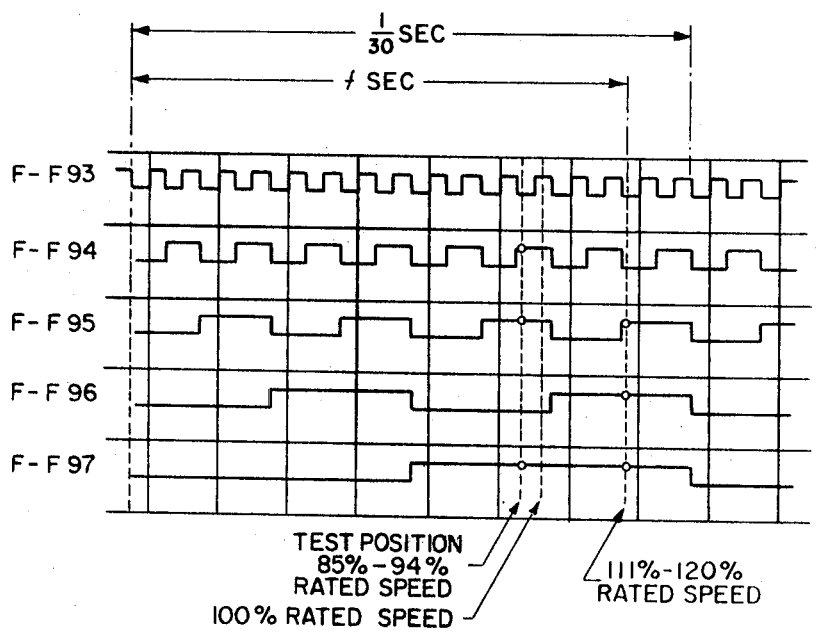
FIG. 5 is a timing diagram of the speed circuit of FIG. 4.

In FIGS. 4 and 5 is illustrated the speed control circuit of the present invention. The circuit of FIG. 4 includes flip-flop circuits 93, 94, 95, 96 and 97, clock 99 and comparator 101. The input to flip-flop circuit 93 is the encoder signal of channel 13 which has the highest repetition frequency and is therefore most suitable for accurate speed control. The flip-flops count the number of pulses from channel 13. Clock 99 provides an output signal 103 that resets flip-flops 93 through 97 each one-thirtieth of a second, for example. Clock 99 also provides an output signal 105 that triggers comparator 101 at time $t$ which occurs just prior to the flip-flop reset. The comparator 101 compares the state of each of flip-flops 93 through 97 at time $t$.

From this it can be seen that flip-flops 93, 94, 95, 96, and 97 form a counter which will count from zero to 31 (00000 to 11111 binary) which corresponds to about one-half inch where the elevator travels 11 feet, or about 3 inches where the elevator travels 66 feet. The length of time required for the counter to reach full count is inversely proportional to the speed of the elevator and by regularly resetting the counter more quickly than it can reach full count, it is possible to determine the speed of the elevator. The larger the count just prior to reset, the faster the elevator is moving. For the given example, this count is 28 (11100) which corresponds to about 111—120 percent of rated motor speed. If the counter ever reaches this number before being reset the comparator output will shut down the system by shutting off power to the motor and applying power to the brake. By setting up a test count of 22, (10110), for example, then the motor can be tested at about 85 percent rated speed. It will be obvious to one skilled in the art this digital differentiation principle may be carried another step and used to measure the acceleration of the elevator.

In accordance with the present invention the logic control system may be modified in several ways to accomplish the described results. For example, only one comparator may be used along with a memory register to hold the necessary binary reference numbers. An electronic sequencer could then be employed to place the reference numbers in the comparator and control the outputs. Since the electronics of the present invention is capable of operating very rapidly, it would be feasible to connect one or more encoders to a small computer programmed to control one or more elevators.

An alternative embodiment of speed monitoring may be employed where a relatively small range of velocities is of interest but requiring high resolution in this area. In this situation the clock provides precise pulses at a much faster rate than those provided by the encoder. The counter counts the number of clock pulses occurring during one encoder pulse. Therefore, the larger the count the slower the encoder is turning. Accordingly, the number the counter reaches before being reset is proportional the time the elevator takes to travel a given distance which is inversely proportional to speed.

In some applications the stretching of the lifting cables as the elevator is loaded may cause some loss of accuracy. An alternative embodiment of the present invention is to connect the encoder to a pilot cable which is under constant tension.

In still another embodiment of the present invention the number of encoder channels and therefore the complexity of the equipment may be reduced where high precision is required only in the vicinity of the stop positions. This may be achieved by using a rack and pinion assembly having a high speed gear for high resolution and a low speed gear for low resolution. The rack may be fastened to the elevator shaft and consists of staggered high and low speed sections to alternately drive the high speed gear and the low speed gear. The high speed gear is engaged by the high speed rack section in the near vicinity and on each side of the different stop positions. The low speed rack section engages the low speed gear during all other positions of elevator travel. This provides high resolution in the vicinity of the stop positions and reduces the total count range and therefore the number of encoder channels by reducing the encoder speed when not in the vicinity of the stop positions.

What we claim is:
1. A control system comprising:
   a. an encoder;
   b. first, second, third and fourth comparators;
   c. the output of said encoder being operatively connected to the inputs of said first, second, third and fourth encoders;
   d. said first and second comparators respectively providing emergency stop signals at positions of maximum and minimum travel of said encoder;
   e. said third comparator providing a stop signal at at least one predetermined stop position between said positions of maximum and minimum travel,
   f. said fourth comparator providing a slow signal at predetermined positions on each side of said predetermined stop position;
   g. the outputs of said first and second comparators are connected to the inputs of first and second gates;
   h. the output of said first gate being operatively connected to the high speed section of a two-speed motor;
   i. the output of said second gate being operatively connected to the low speed section of said two-speed motor;
   j. the output of said third comparator is applied through a first switch to the inputs of said first and second gates; and k. the output of said fourth comparator is applied through a second switch to the input of said first gate and to the input of an inverter, the output of said inverter being connected to the input of said second gate.

2. The device of claim 1 including:
a. a speed control means for an electric motor;
b. said speed control means including a pulse counting device the input of which is connected to the output of said encoder;
c. a speed comparator having one input connected to the output of said pulse counting device and another input connected to a clock; and
d. said speed comparator providing an output signal when the pulse count of said pulse counting device exceeds a predetermined amount during a predetermined time as set by said clock.

3. The device of claim 2 wherein:
a. said pulse counting device comprises a plurality of series connected flip-flop devices; and
b. the input to the first flip-flop of said plurality of series connected flip-flop devices being connected to the channel of said encoder having the highest pulse rate.